F. C. RINSCHE.
ADDING MACHINE.
APPLICATION FILED SEPT. 19, 1914. RENEWED OCT. 16, 1919.

1,325,681.

Patented Dec. 23, 1919.
6 SHEETS—SHEET 5.

Witnesses
E. R. Barrett
Robert Dobberman

Inventor
Franz C. Rinsche
By Peck, Hibben, Davis & Macaulay
Attorneys

UNITED STATES PATENT OFFICE.

FRANK C. RINSCHE, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,325,681.     Specification of Letters Patent.     Patented Dec. 23, 1919.

Application filed September 19, 1914, Serial No. 862,593. Renewed October 16, 1919. Serial No. 331,243.

*To all whom it may concern:*

Be it known that I, FRANK C. RINSCHE, a citizen of the United States, residing at Detroit, in the county of Wayne and State of Michigan, have invented certain new and useful Improvements in Adding-Machines, of which the following is a specification.

This invention relates more especially to the recording function of an adding and listing machine and has special reference to tabulating equipments of such machines, which equipments ordinarily comprise a laterally shiftable paper carriage with suitable means for setting the same at different columnar positions and for effecting automatic line-spacing in whatever position the carriage may be located.

The object of my present invention is to better adapt the tabulating equipment of an adding and listing machine to the handling of sheet paper of stronger texture or greater thickness or stiffness than ordinary letter paper, such for example as now commonly used for ledger sheets in connection with looseleaf systems of bookkeeping. The ordinary roller platen such as employed quite generally in adding and listing machines, has been found to be objectionable, as have also the customary arrangements for feeding sheets in from the rear of the paper carriage, on account of the degree of bending of the sheets, whose texture is such that the bend or curl does not come out. It is obviously desirable that the flatness of the sheets shall be preserved so that when they emerge from the machine their adaptability for handling in the customary way as loose leaves shall not have been impaired. In carrying out my invention I provide for so holding sheets of paper in the laterally shiftable carriage as to avoid all necessity for bending or curling to a degree which will permanently affect the flatness of the sheet, while at the same time I provide for presenting the sheet to the type with sufficient convexity to insure clean printing.

In the drawings which accompany and form part of this specification.

For prior tabulating equipments applied to Burroughs adding machines reference may be had to the following patents: No. 595,864, issued December 21, 1897, No. 913,738, issued March 2, 1909, No. 922,547, issued May 25, 1909, No. 929,056, issued July 27, 1909, No. 977,582, issued December 6, 1910, No. 988,700, issued April 4, 1911, No. 1,028,133, issued June 4, 1912, No. 1,046,546, issued December 10, 1912 and No. 1,063,181, issued June 3, 1913. All of these patents show laterally shiftable paper carriages with roller platens around which the paper, either in sheets or in strip form drawn from a roll, is adapted to pass, being introduced from the rear into the bite between the roller platen and pressure feed rollers and thence being guided over the surface of the roller platen and emerging over the top thereof or vertically from the front side of the platen. In my prior application filed February 21, 1914, Serial No. 820,127, there is shown a form of paper holder specially designed for the handling of ledger sheets and the like, this holder having a high back against which the sheet can rest in flat form, but this holder is not a platen and there is employed in connection with it the familiar roller platen down behind which the sheets are fed so that they must, as in other cases, bend or curl fully half way around the roller platen, which is of relatively small diameter.

Figure 1:
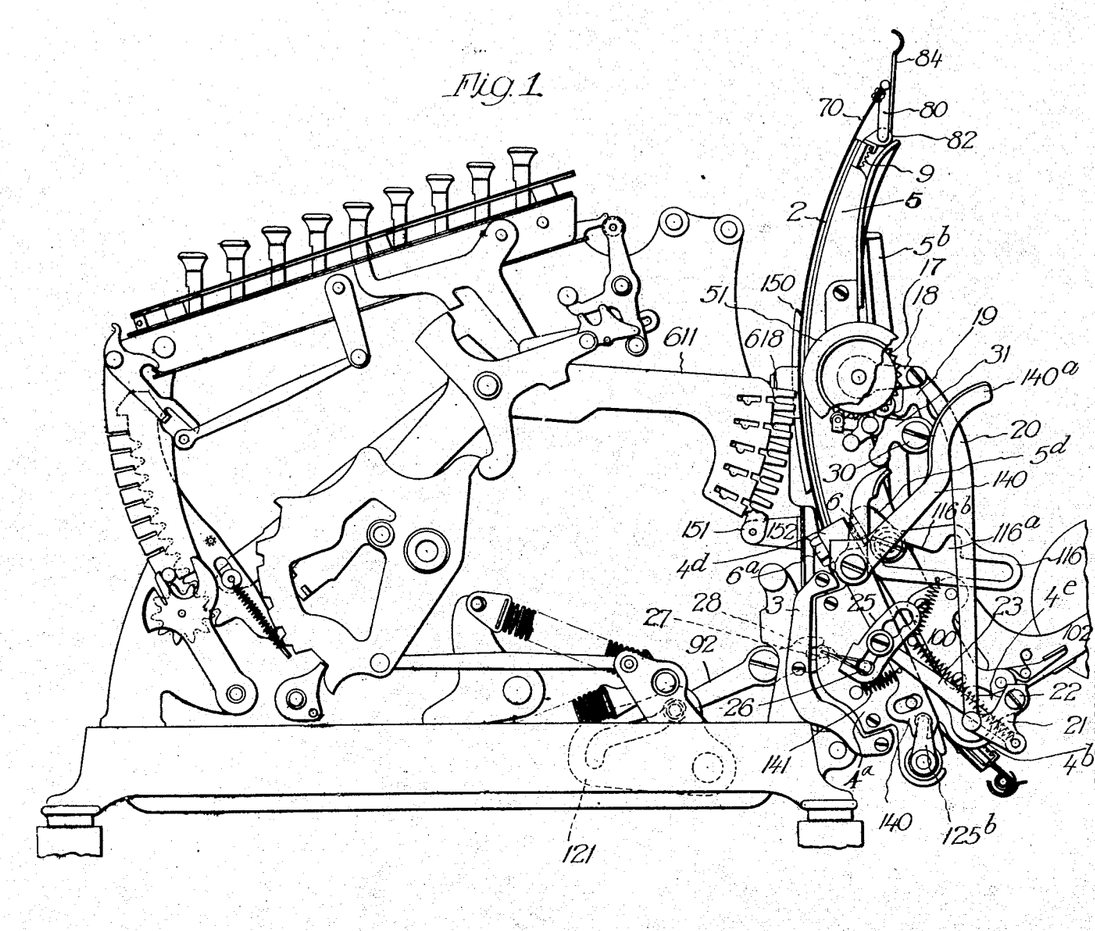
Figure 1 represents in right side elevation an adding and listing machine of the well-known Burroughs type with a preferred form of embodiment of my present invention applied thereto.

According to my present invention I do away altogether with the roller platen and employ a holder for the sheets, which holder itself constitutes a platen. This combined holder and platen is in the form of a segment of a cylinder and is so mounted at the rear of the machine that a sheet of paper held upon it may be presented to the type much as paper has heretofore been presented to the type while overlying a roller platen, in that there is a convexity with relation to the type which though not anywhere near as pronounced as that incident to the use of a roller platen is nevertheless sufficient to insure clean printing, particularly when employed in connection with segmental type-carriers such as commonly found in Burroughs adding machines. Referring to Fig. 1, reference numeral 611 designates the familiar type-carrying levers of a Burroughs machine, which levers have segmental rear portions carrying segmental series of types 618. The reference numeral 2 designates the platen of my invention whose convex relationship to the type is clearly portrayed in Fig. 1. This platen is arranged to work up and down in suitable guides supplied by a frame structure mounted to rock forward and backward somewhat as does the familiar cradle of the prior constructions, in which the roller platen is carried. It will be understood that the sheet of paper lies over this platen backed up throughout thereby and that there is no feeding of the paper beyond the platen as work proceeds after the manner of feeding of paper past a roller platen. In consequence the platen of my present invention is required to have a considerable range of vertical movement and correspondingly the frame structure which supplies the guides must have considerable vertical extent making it quite a different affair from the familiar roller platen cradle and also calling for a difference in the mounting of this cradle upon the laterally shifting carriage. In fact some modification is required of the carriage proper and the track on which it runs in order to accommodate these parts to the new type of platen which is the subject of this application. Thus the track 3 is located much lower down on the back of the machine than such tracks as shown in the above-mentioned patents and in fact so low down that its lower portion overhangs the base of the machine so that I find it expedient to put upon this track-casting the hinge lugs 3ª such as commonly found upon the back panel of the machine, these lugs fitting between the usual lugs upon the base. The track casting is so formed that when fastened against the back of the machine its upper and lower ball-bearing grooves will be in a plane at an angle to the vertical with the upper part of the track forward so that the carriage will have a corresponding forward tilt and the platen guide frame or cradle may be mounted at its lower end in side brackets of the carriage so as to most effectively correlate the platen to the type having regard to the desired convexity at the printing line. The carriage proper is designated by the numeral 4 and the side brackets by the numeral 4ª, it being noted that these brackets have an increased angularity over that of the carriage proper, besides which the bosses 4ᵇ at the lower ends of these brackets and to which the cradle to be presently described is pivoted, project rearwardly from the main portion of the brackets. The cradle comprises segmental side pieces 5 with bosses at their lower ends into which screw pivot studs 5ª which journal in the aforesaid carriage-bracket bosses 4ᵇ. Said segmental side pieces are rigidly united by crossing arms or webs 5ᵇ and a horizontal web 5ᶜ, Fig. 2. When the cradle is rocked forward lugs 5ᵈ on the side pieces 5 abut against the heads of bolts 6 which screw into ears 4ᵈ of the carriage brackets and are locked by nuts 6ª, (Fig. 1). Obviously these abutment bolts provide for adjustment in the interest of securing just the right amount of forward swing of the platen to best position it for receiving type impressions.

Figures 4, 5, 6:
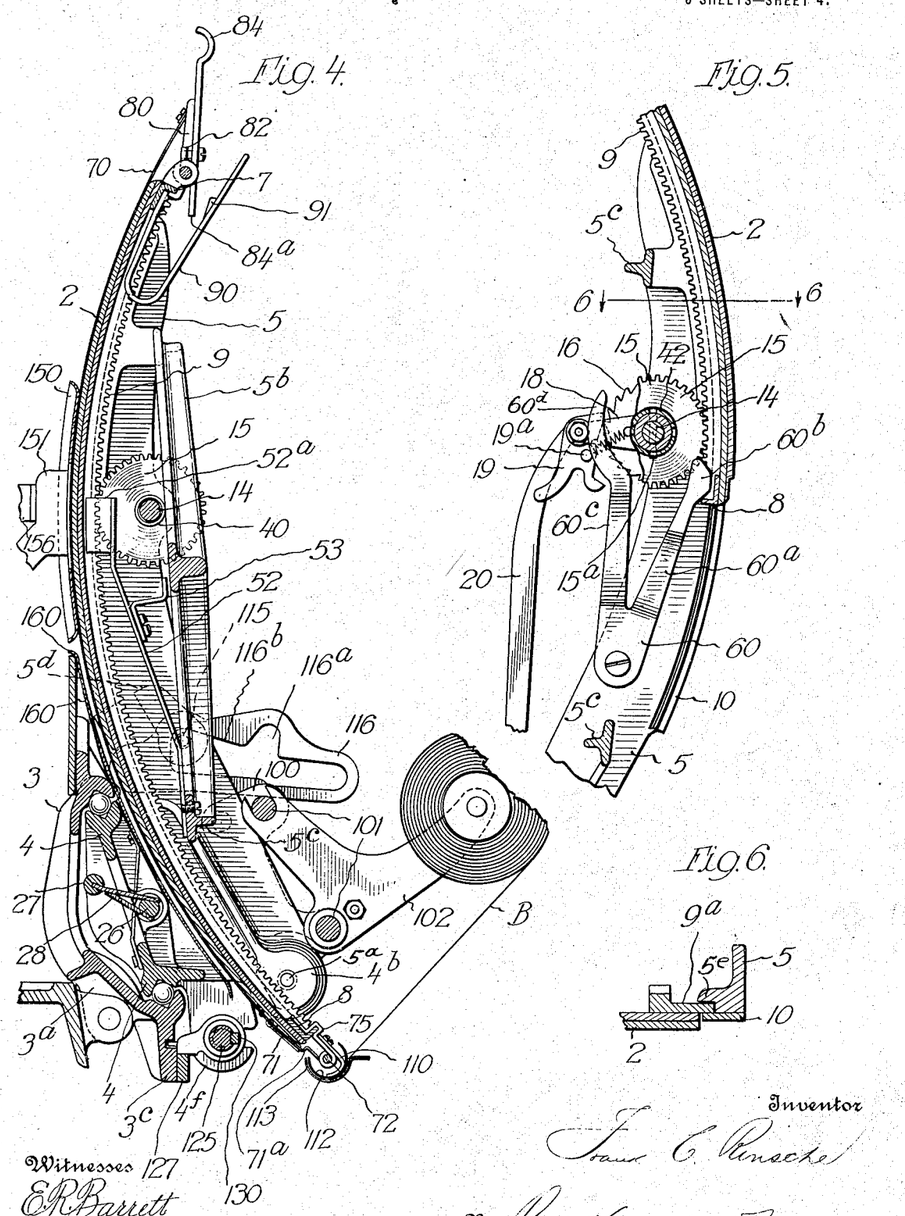
Fig. 4 is a vertical cross section taken substantially on line 4—4 of Fig. 3.
Fig. 5 is a vertical cross section taken on line 5—5 of Fig. 2.
Fig. 6 is a detail horizontal section taken on line 6—6 of Fig. 5.

The platen 2 comprises a metal plate faced with rubber. Angle strips or bars 7 and 8 are secured across the back of the metal plate at the top and bottom, serving to stiffen the same and functioning otherwise as will presently be pointed out. Segmental racks 9 are secured to the back of the plate along the sides thereof and serve to further stiffen it, besides constituting media through which line spacing movements are imparted to the platen. These racks have laterally-projecting flanges 9ª which overlie rabbeted portions 5ᵉ of the cradle side pieces 5 (Fig. 6). Metal strips 10 secured to the faces of said cradle side pieces complete grooves in which the said rack flanges are confined for purposes of guiding the platen in its movements in a circular path.

Figure 2:
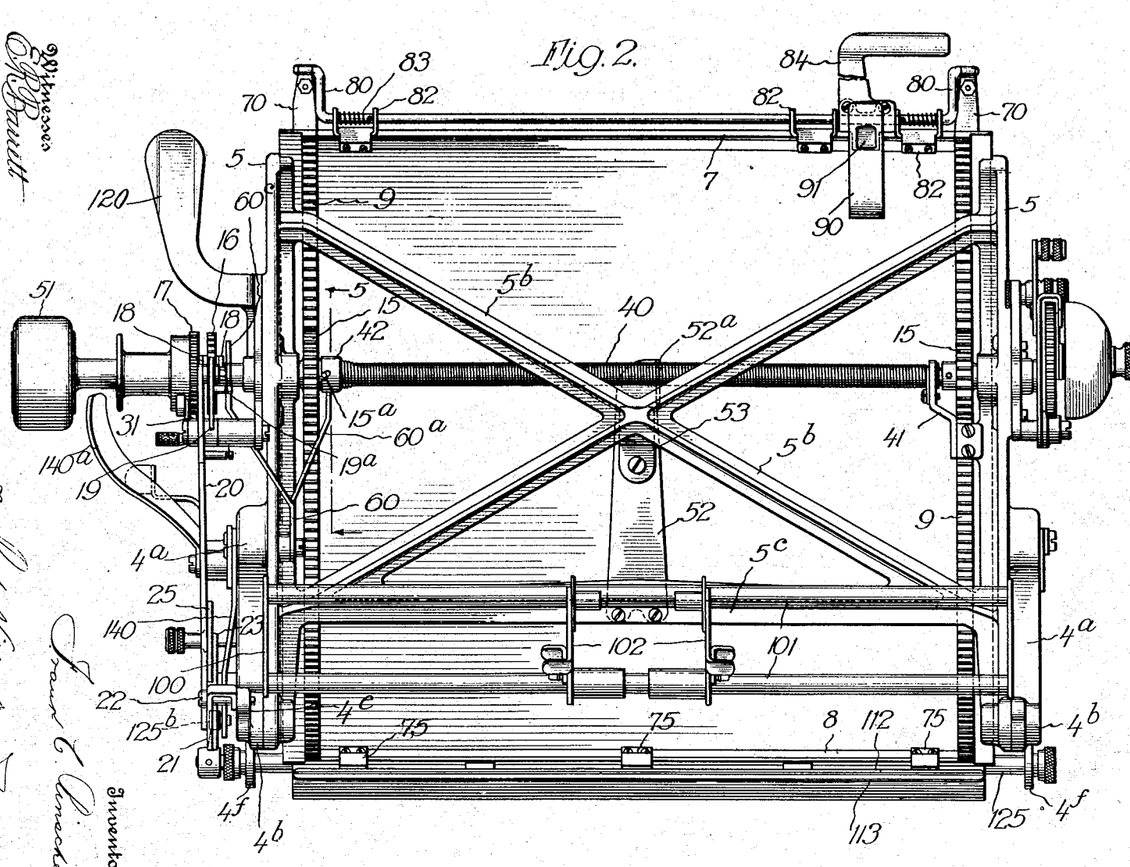
Fig. 2 is a rear elevation.

Referring next to the line-spacing mechanism, a shaft 14 is journaled in bearings on the cradle side pieces 5, and pinions 15 are fastened to this shaft near opposite ends thereof, said pinions meshing with the racks 9 respectively. Said shaft protrudes at the right where it carries a feed ratchet 16 and detent wheel 17. A pair of arms 18 journaled upon the shaft on opposite sides of said ratchet carry between them a pawl 19, and a link 20 connects said arms with a bell crank lever 21 pivoted on a stud 22 which is secured in a short arm 4ᵉ of the righthand carriage bracket 4ª. A link 23 connects this bell crank lever with a slotted arm 25 fastened to a rock shaft 26 extending from side to side of the carriage and journaled in the end plates or brackets thereof. This rock shaft corresponds with those to be found in the before mentioned patents as parts of line-spacing bails and in the present instance constitutes the pivot shaft of a similar bail comprising a cross rod 27 and arms 28 connecting it with said rock shaft. Owing to the low position of the carriage in the present instance, a direct engagement between this cross rod and the feed lever of the machine is feasible. Said lever is designated 92 as in Patent 1,046,546. Its bifurcated rear end embraces the cross rod of said bail and its forward arm carries a roller coöperating with a cam 121 in the familiar manner. There is the usual provision for adjustment between the link 23 and arm 25 to vary the line-space stroke, and it will be obvious that the connections described provide for step by step turning of the ratchet wheel. This is accompanied by step by step turning of the pinions 15 in a direction to elevate the platen. As in machines of said prior patents, the pawl 19 is normally disengaged from the ratchet through contact of a curved finger of the pawl with a stud 30 on which is pivoted the familiar spring-held detent arm 31 having a small roll which engages the detent wheel 17. In view of the weight of the platen, I provide means additional to these usual detent devices, for resisting gravitation. Thus I surround the shaft 14 with a long coiled spring 40 (Fig. 2) which at one end is secured to a bracket 41 fastened to a lug on the left side piece 5 of the cradle, said spring being secured at its other end to a notched cup 42 embracing the hub of the righthand gear wheel 15. The spring is suitably tensioned and one of the notches of its cup 42 is engaged with a pin 15ª on said hub and it acts in opposition to descent of the platen and with sufficient force to counterbalance the same and insure its standing in any position to which it is moved.

The printing line is indicated by markers 50 fastened to the strips or plates 10 (Fig. 3) and the sheet overlying the platen is adjusted to these markers through use of a twirler knob 51 on the end of the shaft 14, it being understood that the bottom edge of every sheet put in the machine is gaged the same. The printing may begin with the platen in any intermediate position but the last imprint which any sheet can take will occur with the platen in the same position in every instance. This will be the uppermost position to which the platen can be moved. It is desirable to definitely and positively limit the upward movement of the platen and to this end I secure to the horizontal cross web 5ᶜ an upright arm 52 having a forwardly turned abutment flange 52ª at its upper end, against the under edge of which flange the lower angle bar 8 strikes when the platen reaches the limit of its upward movement. Downward movement of the platen is similarly limited by the striking of the upper angle bar 7 against the top edge of the flange. The said arm 52 is preferably reinforced by a bracket 53 which extends adjacent the crossing of the diagonal webs 5ᵇ.

In order to prevent the machine from becoming locked through blocking of the line-space mechanism when the platen is at the uppermost limit of its movement, I provide for automatically disengaging the pawl 19 from the ratchet wheel 16 upon arrival of the platen at such extreme of movement. To this end I pivot a forked rocker piece 60 to the righthand side piece of the cradle frame (Figs. 2 and 5), the two branches of this forked rocker piece being offset from each other laterally and one arranged to be acted upon by the platen and the other arranged to act upon the pawl. Thus the forward branch 60ª has a cam rise 60ᵇ at its upper end against which the flange of the lower angle bar 8 strikes. The rear branch 60ᶜ has a curved terminal portion 60ᵈ extending in front of a pin 19ª on the pawl. When the rocker piece is thrown rearward through engagement of the angle strip with the cam rise, as illustrated in Fig. 5, the rear branch disengages the pawl from the ratchet so that any further operation of the machine will not cause the pawl to act against the ratchet.

Figure 3:
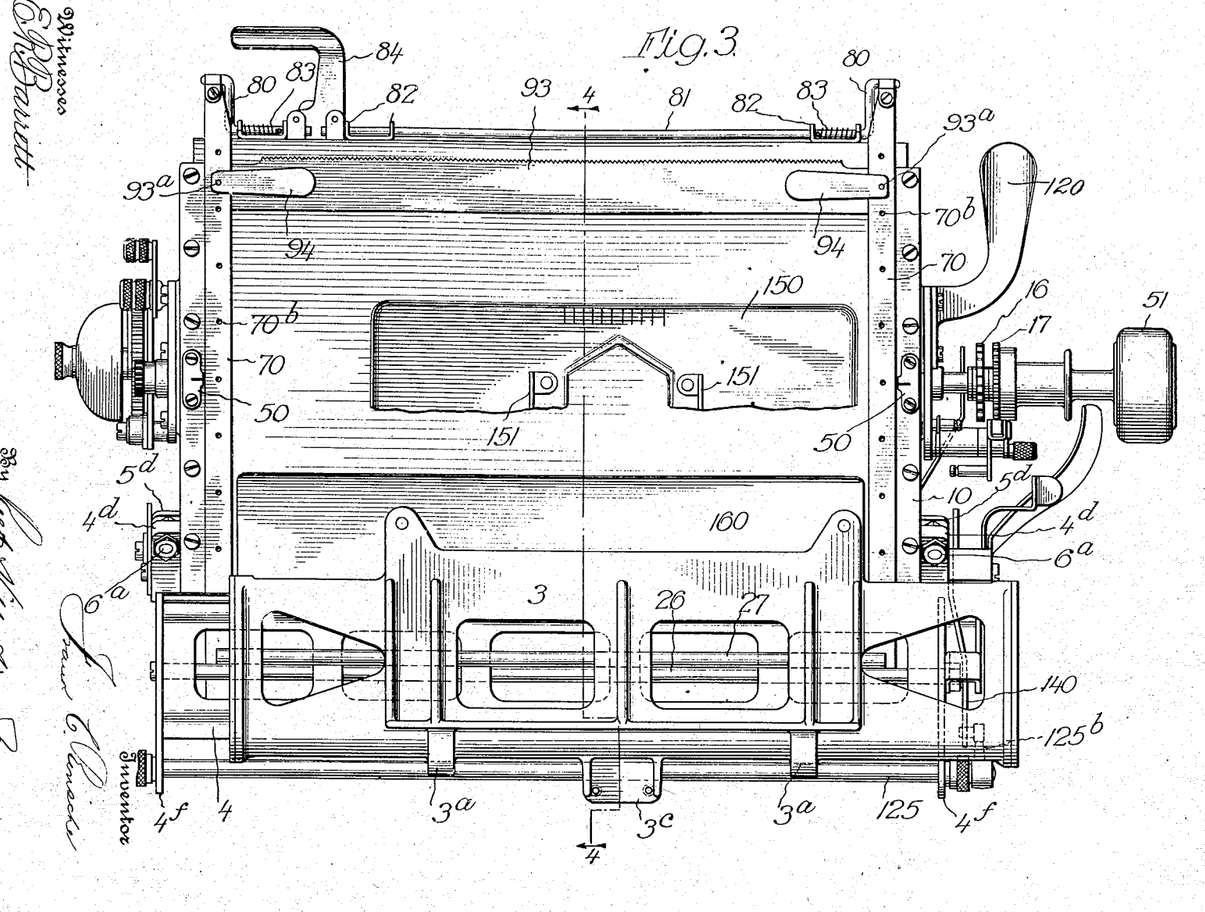
Fig. 3 is a front elevation of the tabulating equipment omitting the machine proper.
Figures 7, 8, 9, 10, 11:
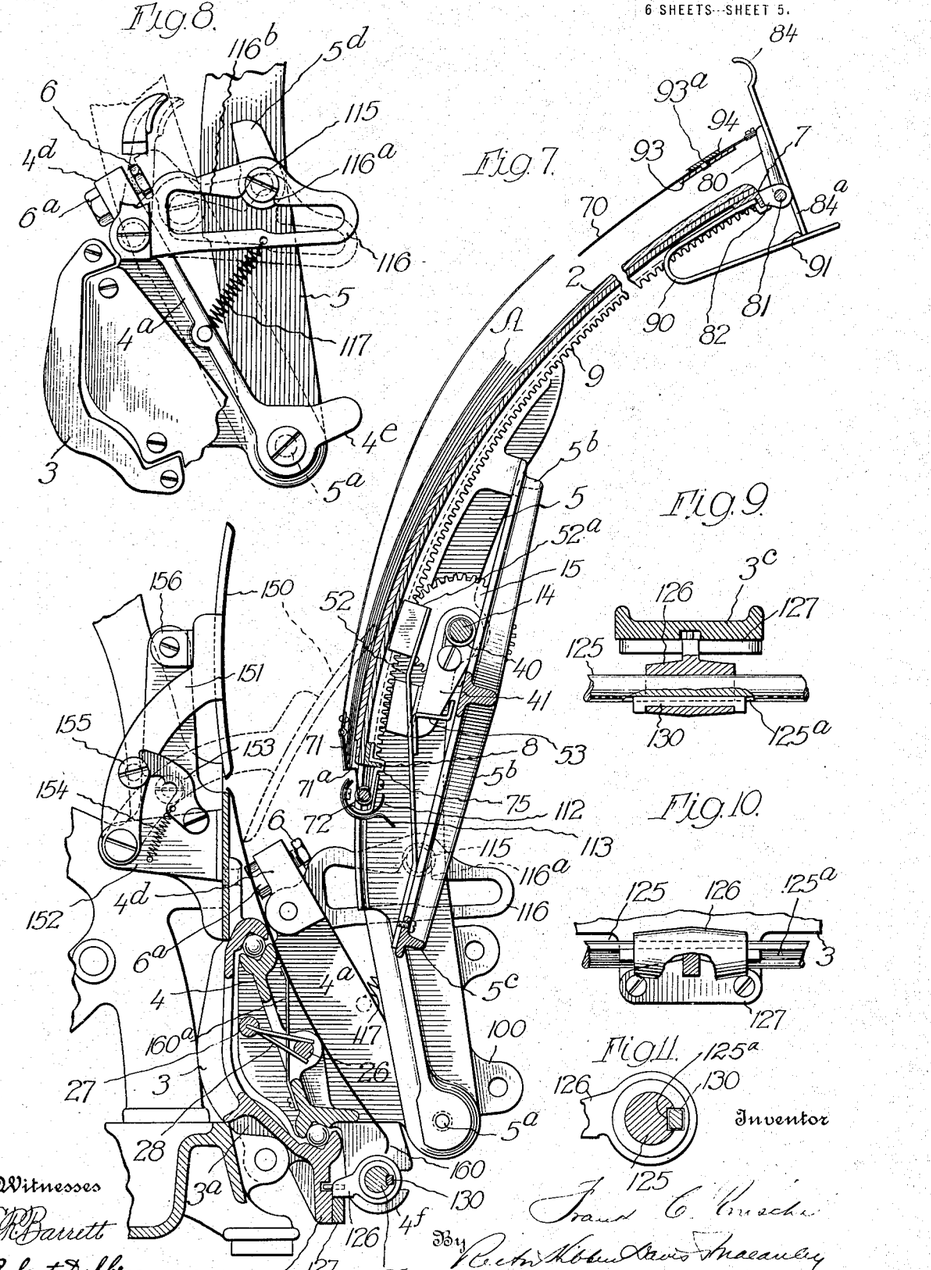
Fig. 7 is a vertical section similar to Fig. 4 but with the platen thrown back.
Fig. 8 is a fragmentary right side elevation under similar conditions.
Figs. 9, 10 and 11 are sectional details of the frictional column locating means.
Figure 12:
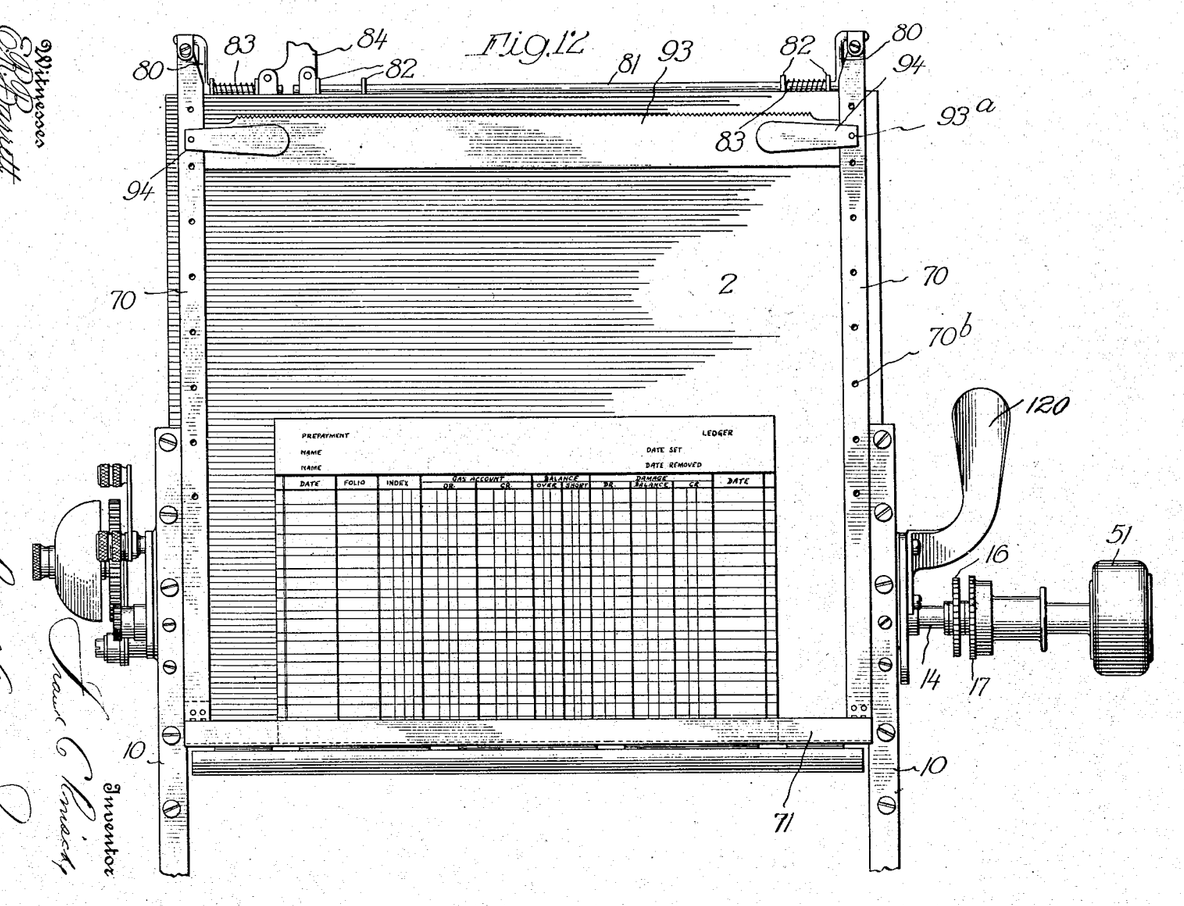
Fig. 12 is a front elevation of the platen with a ledger sheet in place thereon.

For the purpose of clamping one or more sheets against the face of the platen, I employ flexible steel bands 70 overlying the platen at opposite sides thereof as illustrated in Figs. 3 and 12. These bands are pivotally connected at their lower ends to a strip or bar 71 which extends across the lower margin of the platen and is itself pivoted to a rod 72. The latter occupies a position below and to the rear of the lower edge of the platen and extends from side to side thereof, being carried in bearings supplied by a number of brackets 75 fastened to the lower angle bar 8. The cross strip 71 besides serving to clamp the lower margin of the inserted sheet against the platen, supplies a ledge for the lower edge of the sheet to rest upon. Thus this bar is bent substantially at a right angle adjacent the lower edge of the platen as shown at 71ª (Fig. 7). The upper ends of the steel straps 70 are hung upon laterally turned end portions of crank arms 80 of a rock shaft 81 which is journaled in brackets 82 fastened to the upper angle bar 7 (Fig. 2), three such brackets being here shown. Springs 83 coiled around this shaft between portions of two of said brackets tend to turn the shaft in a direction to throw the strips 70 against the platen, and likewise the strip 71. A handle 84 is fastened to the shaft 81 and by forcing the same forward said springs may be overcome and the bands 70 flexed and the strip 71 swung forward, as shown in Fig. 7. One or more sheets such as represented at A in Fig. 7, may then be dropped into position. To relieve the operator of the necessity of keeping hold of the handle 84 while the sheets are being inserted, I provide a latch in the form of a bowed steel strip 90 fastened to the upper angle bar 7 and having a struck-up portion 91 to engage a downward extension 84ª of the handle. Thus when the handle is forced forward the end of this extension rides over the struck-up lug 91 and is caught and held thereby (Fig. 7). Said lug is sufficiently beveled on its rear end to permit the handle being forced back when the sheets are to be clamped upon the platen. As soon as the end of the handle extension passes the crown of the lug, the springs 83 snap the bands and the strip 71 to clamping position, such as shown in Fig. 4.

I also provide an upper cross strip 93 (Fig. 12) arranged to be adjustably connected with the bands 70. Thus the latter are made with series of perforations 70ᵇ and the said cross strip 93 extends behind said bands and carries short pins 93ª to engage said perforations. Keepers in the form of thin resilient plates 94 are fastened to the strip 93 and adapted to overlap the bands 70 respectively, said keeper plates being perforated to engage said pins, as shown in Fig. 12. The strip can thus be adjusted to engage over the upper margins of sheets of varying dimensions. As occasion may arise for running paper from a roll over the platen, I secure brackets 100 to the side pieces 5 of the cradle and mount a pair of cross rods 101 in ears of these brackets and arrange a roll holder on these rods, said holder comprising a pair of arms 102 with bosses to slide on the lower cross rod and bifurcated upper ends to embrace the upper rod. The previously mentioned brackets 75 at the lower end of the platen are utilized to support a guide for the roll paper B. Thus clips 110 fastened to said brackets carry a partly tubular plate 112 under which there is a similar plate 113 secured to and slightly spaced from the first plate and at the rear end bent back so as to form with the upper rear portion of the first plate a flaring mouth into which the roll paper may be inserted. This paper then passes through the space between the plates and thence up over the platen and under the top cross strip 93 which is preferably formed with a serrated upper edge for use in severing the roll paper.

Rearward swinging of the platen and cradle is limited by abutment of studs 115 on the lugs 5ᵈ against the abrupt rear sides of notches 116ª in slotted plates 116 pivoted to the carriage brackets 4ª and drawn down by springs 117. When the platen is forward the said studs occupy upper forward ends of the slots in said plates and the latter are in lowered position, as shown in Figs. 1 and 4. Downwardly inclined cam edges 116ᵇ define the upper sides of the forward portions of the slots and through engagement with the studs as enforced by the springs 117 serve to offer resistance to rearward swinging of the platen and cradle. The weight of the latter is considerable and will ordinarily suffice to hold the platen firmly up to its work but when thrown rearward as shown in Fig. 7, the weight is about central. The forward sides of the notches 116ª slope sufficiently to permit the camming upward of the plates by a slight amount of force applied to a handle 120 fastened to the right side piece of the cradle to facilitate the rocking of the latter and the platen. As soon as the studs 115 pass beyond these sloping front sides of said notches, cam edges 116ᵇ take effect to force the platen forward and this action coupled with the overbalancing of the platen and parts which move with it, will serve to throw the platen to printing position without the necessity of its being forced to such position by the operator.

In the present instance the lateral position of the carriage is frictionally maintained and subject to indefinite variation within the limits of shift from one extreme position to the other. Thus the tabulating rod 125, which extends between depending ears 4ᶠ of the carriage end-pieces and is locked therein against any independent lateral movement, does not have secured to it the series of fingers of the character shown in several of the above-mentioned prior patents, which fingers in those prior constructions determine the columnar position of the carriage, but the said rod in this instance has a frictional connection with a single finger 126, which finger remains permanently interlocked with the notch of a fixed plate 127 secured to a short skirt 3ᶜ formed at the middle of the track-casting (Figs. 4 and 7). The rod is grooved lengthwise as shown at 125ª (Figs. 9–11) and the boss of the finger is similarly grooved. A key 130 engages these grooves and extends at its ends over the ends of said boss (Fig. 9). The rod may slide freely through the boss but force applied to turn the rod will cause the key to bind in the grooves and create sufficient friction to hold the carriage in position. A crank arm 125ᵇ on the righthand end of the said rod has a stud engaging the bifurcated lower end of a pivoted arm or lever 140 (Fig. 1) which is held forward by a stout spring 141, said spring thus applying force to turn the rod 125 in such manner as to create friction for holding the carriage in position in the manner just mentioned. The said arm or lever is pivoted on the same stud which supports the righthand slotted plate 116 and said lever has a handle 140ª by which it can be rocked to turn the rod 125 and relieve the friction when the carriage is to be shifted to a new position.

I employ a line-finder somewhat similar to those heretofore used (see for example said Patent No. 922,547), this line-finder being in the form of a plate 150 extending from side to side of the machine proper and apertured centrally, as shown in Fig. 3, for the projection through of the type 618 (Fig. 1). Said line-finder plate is curved to conform with the platen and lie closely adjacent the same when it is in printing position as illustrated in Fig. 4, thus serving under these conditions to hold the sheet of paper smoothly over the platen around the printing line. Said plate is carried by a pair of side arms 151 which are pivoted on brackets 152 of the machine frame. Detents 153 (Fig. 7) are pivoted to these same brackets and springs 154 enforce engagement between these detents and studs 155 carried by the said arms 151. The plate 150 is held forward, with the vertical edges of its side arms 151 in contact with lugs 156 on upstanding arms of the brackets 152, by the engagement of forward inclined end edges of the detents 153 with the studs 155, as clearly shown in Fig. 7.

When the platen is rearward, as shown in Fig. 7, and it is desired to locate the line of printing the said plate 150 will be forced rearward to the dotted-line position shown in this figure of the drawing, the springs 154 being overcome and the studs 155 seating in notches at the middle portions of the detents 153 so that the plate will be detained in the dotted-line position and the operator will not be required to forcibly hold it there. The plate is marked, as illustrated in Fig. 3, for purposes of effecting vertical alinement in the printing.

A guard plate 160 is arranged on the carriage so as to prevent entanglement of the paper, in sheet or strip form, when the carriage is shifted back and forth, and also aid in guiding the paper over the platen. This plate extends from side to side of the carriage and vertically from a point just over the rod 125 to a point just below the line-finder plate 150 when the latter is forward or in normal position, so that these two plates are virtually continuations of each other. The lower plate 160 is curved like the upper plate and may be conveniently secured in position over the carriage rail and track-casting by thin metal arms 160ª extending through the open center of the carriage rail and fastened thereto and to the plate.

A single inserted sheet may be printed upon at a time, or a stack of sheets may be inserted, as shown in Fig. 7, and the uppermost or outer sheet printed upon and then removed by itself and the next lowermost sheet printed upon. When the platen is to be lowered, after the printing upon one sheet has been completed and a new sheet accomplished either by pressure applied directly upon the top of the platen, or by operating the twirler knob 51.

It will be seen that not only does the above-described construction serve the purpose of enabling relatively stiff sheets or cards to be inserted and removed and printed upon cleanly without involving pronounced bending or curling and so without affecting the flatness for stacking or filing or temporary binding, but, aside from this, the sheets or cards can be inserted and removed with much greater facility and much more expeditiously for several reasons. For one thing, no maneuvering by the operator to get the sheet square is necessary for it will simply be dropped over the face of the platen onto the ledge or shoulder 71ª, the platen being in uppermost position and the clamping strip 71 thrown forward. The mere tripping of the handle 84 results in clamping of the sheet in this correct position. This is of considerable importance because in tabulating upon sheets of this sort the same sheet is inserted and removed many times, as for example in bank work, and of course it should not vary in position one time from another, otherwise the tabulation would not be effected with entire accuracy. Another advantage results from the absence of a friction feed such as that incident to the running of paper between a roller platen and pressure rollers. With such character of feed it is well nigh impossible to eliminate all slippage and thereby insure absolutely uniform spacing and alinement, whereas with my construction this is insured since the sheet is firmly clamped against the platen and the line-spacing involves no friction feed of the paper at all. This is true with respect to thin as well as thick paper and also whether the paper is in sheet form or in the form of a strip drawn from a roll. A further advantage of the arrangement is that cards of quite small size, such as those used in ordinary card indexes, or even smaller cards, can be successfully handled, whereas with the ordinary roller platen arrangement this is not at all practicable. It will be noted in this connection that the sheet need only be clamped at its lower edge as illustrated in Fig. 12 in which connection it is to be observed that the bands 70 are not called upon to engage the sheet but merely serve as connections for operating the clamping strip or bar 71 and for carrying the upper cross strip or bar 93 when that is employed. A relatively stiff sheet in the nature of a card may, when dropped over the face of the platen, assume an upright position at a tangent to the convex surface of the platen but when the latter is swung forward the sheet or card will be carried against the plates 150 the platen. As a matter of fact the operator will usually throw back the finder-plate 150 the next thing after inserting and clamping the sheet or card, and the springs 154, added to the weight of the plate and its arms, will lay the paper back over the platen and then act to smooth it down as the platen is lowered to adjust the paper for the first imprint. Of course when the platen is then thrown forward the finder-plate yields and returns to its folded-up state wherein it alines with the lower guard plate 106, the two together keeping the paper close against the platen throughout. In the case of a longer sheet than that illustrated in Fig. 12 or a thinner sheet it may be found desirable to employ the upper cross strip or bar 93.

It is to be understood that the above-described construction, while well adapted to carry out my invention, may be departed from in many ways within the scope of the invention as defined by appended claims.

I claim:

1. In a machine of the class described, the combination of printing means including front-strike type; a vertically arranged platen having means for upholding a sheet or card; means for raising the platen step by step from a lowered position, with provisions for permitting single-stroke downward movement of the platen; and means for definitely limiting such movement to aline the platen for the top line of printing.

2. In a machine of the class described, the combination with printing means, of a platen facing the same in the form of a segment of a cylinder mounted to move in an arc of such cylinder, and having means extending along its back by which to actuate it, said means being located in rear of its face and within its lateral margins, and mechanism operating upon said means to advance the platen step by step.

3. In a machine of the class described, the combination with printing means, of a platen facing the same in the form of a segment of a cylinder mounted to move in an arc of such cylinder, and having means extending along its back by which to actuate it, and mechanism operating upon said means to advance the platen step by step with provisions for automatically disabling said mechanism when the platen has been advanced a predetermined extent.

4. In a machine of the class described, the combination with printing means, of a platen facing the same in the form of a segment of a cylinder mounted to swing about a horizontal axis, means for squaring the lower edge of a sheet dropped over the face of the platen and clamping said sheet thereagainst, and means for elevating the platen step by step.

5. In a machine of the class described, the combination with printing means, of a platen facing the same in the form of a segment of a cylinder mounted to swing about a horizontal axis, a combined sheet-supporting ledge and sheet-clamp hinged at the lower end of the platen, means for operating said clamp, and means for advancing the platen step by step.

6. In a machine of the class described, the combination with printing means, of a platen facing the same in the form of a segment of a cylinder mounted to swing about a horizontal axis, means for squaring the lower edge of a sheet dropped over the face of the platen and clamping said sheet thereagainst, means for laying the sheet back over the face of the platen, and means for elevating the platen step by step.

7. In a machine of the class described, the combination with printing means, of a platen facing the same in the form of a segment of a cylinder mounted to swing about a horizontal axis, a cradle in which said platen is mounted and which rocks to carry the same toward and away from the printing means, and a plate extending laterally across the face of the platen and mounted to swing toward and from the same with provisions for yieldingly holding it against the platen.

8. In a machine of the class described, the combination with printing means, of a platen facing the same in the form of a segment of a cylinder mounted to swing about a horizontal axis, a cradle in which said platen is mounted and which rocks to carry the same toward and away from the printing means, a plate extending laterally across the face of the platen and mounted to swing toward and from the same, and a spring-held cam-latch for holding said plate yieldingly in retracted or advanced position.

9. In a machine of the class described, the combination with printing means, of a platen facing the same in the form of a segment of a cylinder mounted to swing about a horizontal axis, and a cradle for said platen comprising side pieces with curved guides for said platen to run in, said cradle adapted to be rocked to carry the platen toward and away from the printing means.

10. In a machine of the class described, the combination with printing means, of a platen facing the same in the form of a segment of a cylinder mounted to swing about a horizontal axis, a cradle for said platen comprising side pieces with curved guides for said platen to run in, said cradle adapted to be rocked to carry the platen toward and away from the printing means, and means for elevating the platen step by step in said guides.

11. In a machine of the class described, the combination of printing means including front-strike type; a segmental platen vertically arranged and having means for upholding a sheet or card; guiding means for said platen; means extending vertically lengthwise of said platen through which to effect step by step upward movement thereof; and intermittently acting mechanism engaging said means.

12. In a machine of the class described, the combination of printing means including front-strike type, a segmental platen vertically arranged and having means for upholding a sheet or card; guiding means for said platen; a rack extending vertically lengthwise thereof; a gear wheel in mesh with said rack; and intermittently acting mechanism applied to said gear wheel.

13. In a machine of the class described, the combination with printing means, of a platen in the form of a segment of a cylinder, guiding means therefor, means extending lengthwise thereof through which to move said platen, operating mechanism engaging said means and adapted to actuate the same and the platen step-by-step in one direction, and means for automatically disabling said mechanism when the platen has advanced a predetermined extent.

14. In a machine of the class described, the combination with printing means, of a platen in the form of a segment of a cylinder, guiding means therefor, a rack on said platen, a gear wheel meshing with said rack, ratchet and pawl mechanism for turning said gear wheel, and a tripping device operated by the platen to disengage the ratchet and pawl.

15. In a machine of the class described, the combination with printing means, of a platen in the form of a segment of a cylinder having an end-flange, guiding means for said platen, a rack on the latter, a gear, wheel engaging the rack, ratchet and pawl mechanism for turning said gear wheel, and a pivoted tripping arm operated upon by the end-flange of the platen and adapted to disengage the pawl from the ratchet.

16. In a machine of the class described, the combination with printing means, of a platen in the form of a segment of a cylinder, guiding means therefor, means extending lengthwise thereof through which to move said platen, operating mechanism engaging said means and adapted to elevate the same step-by-step, and means for counterbalancing the platen.

17. In a machine of the class described, the combination with printing means, of a platen in the form of a vertically-arranged segmental plate, guiding means therefor, a spring to counterbalance the weight of the platen, means extending lengthwise thereof through which to move it vertically, and operating mechanism engaging said means and adapted to actuate the same and thereby elevate the platen step-by-step.

18. In a machine of the class described, the combination with printing means, of a platen in the form of a segment of a cylinder, guiding means therefor, a rack on said platen, a gear wheel meshing with said rack, a shaft carrying said wheel, means applied to said shaft for turning the same step-by-step, and a spring coiled around said shaft and acting to counterbalance the platen.

19. In a machine of the class described, the combination with printing means, of a platen in the form of a segment of a cylinder, straps anchored to the platen at one end thereof, and means for clamping said straps against the platen and for bowing them out to admit paper.

20. In a machine of the class described, the combination with printing means, of a platen in the form of a segment of a cylinder, straps anchored to the platen at one end thereof, means for clamping said straps against the platen and for bowing them out to admit paper, and a spring to operate said means one way.

21. In a machine of the class described, the combination with printing means, of a platen in the form of a segment of a cylinder, straps anchored to the platen at one end thereof, a rock-rod having crank arms to which said straps are attached, a spring to turn the said rod in one direction, and a catch to restrain said spring.

22. The combination with a platen in the form of a segment of a cylinder, a paper-clamping bar hinged at the lower end of said platen and shouldered to receive the bottom edges of sheets of paper, straps coupled to said bar and overlying the platen, and means for bowing and clamping said straps.

23. In a machine of the class described, the combination with printing means, of a platen in the form of a segment of a cylinder, straps anchored to the platen at one end thereof, means for clamping said straps against the plate and for bowing them out to admit paper, and a cross strip or bar carried by said straps.

24 In a machine of the class described, the combination with printing means, of a platen in the form of a segment of a cylinder, straps anchored to the platen at one end thereof, means for clamping said straps against the platen and for bowing them out to admit paper, and a cross strip or bar carried by said straps, the latter having series of perforations and the cross strip having studs to engage the same and keepers to engage the studs.

25. The combination with a platen in the form of a segment of a cylinder, a paper clamping bar hinged at the lower end of said platen and shouldered to receive the bottom edges of sheets of paper, straps coupled to said bar and overlying the platen, means for bowing and clamping said straps, and an upper cross strip or bar carried by the straps.

26. The combination with a platen in the form of a segment of a cylinder, a paper clamping bar hinged at the lower end of said platen and shouldered to receive the bottom edges of sheets of paper, straps coupled to said bar and overlying the platen, means for bowing and clamping said straps, and an upper cross strip or bar carried by the straps with provisions for adjustment up and down.

27. In a machine of the class described, the combination of printing means including front-strike type; a vertically arranged platen having means for upholding a sheet or card; means extending vertically along the back of the platen through which to effect step by step upward movement thereof, said means being located in rear of its face and within its lateral margins; and intermittently acting mechanism engaging said means.

28. In a machine of the class described, the combination of printing means including front-strike type; a vertically arranged platen having means for upholding a sheet or card; means extending vertically along the back of the platen through which to effect step by step upward movement thereof; and intermittently acting mechanism engaging said means, with provisions for permitting single-stroke downward movement of the platen.

29. In a machine of the class described, the combination of printing means including front-strike type; a vertically arranged platen having a ledge for upholding a sheet or card; and means for effecting step by step upward movement of the platen.

30. In a machine of the class described, the combination of printing means including front-strike type; a vertically arranged platen having a combined ledge and clamp for holding a sheet or card; and means for effecting step by step upward movement of the platen.

31. In a machine of the class described, the combination of printing means including front-strike type; a vertically arranged platen; a combined sheet supporting ledge and sheet clamp hinged at the lower end of the platen; means for operating said clamp; and means for effecting step by step upward movement of the platen.

32. In a machine of the class described, the combination of printing means including front-strike type; a vertically-arranged platen having means for upholding a sheet or card; a rack extending vertically along the back of the platen in rear of its face and within its lateral margins; and intermittently acting mechanism engaging said rack.

33. In a machine of the class described, the combination of printing means including front-strike type; a vertically-arranged platen having means for upholding a sheet or card; a rack extending vertically along the back of the platen with its teeth directed rearwardly, said rack being located in rear of the face of the platen and within its lateral margins; and intermittently acting mechanism engaging said rack.

FRANK C. RINSCHE.

Witnesses:
R. S. MIELERT,
R. W. FAIRCHILD.